INVENTORS
SPENCER M. CORK
GAROLD K. JENSEN
JAMES E. McGEOGH
BY
ATTORNEY

INVENTORS
SPENCER M. CORK
GAROLD K. JENSEN
JAMES E. McGEOGH

BY
ATTORNEY

3,329,903
ELECTRONIC COMMUTATOR HAVING AUTOMATIC SELF-START AND RESET INSURING MEANS

Spencer M. Cork, Camp Springs, Md., Garold K. Jensen, Alexandria, Va., and James E. McGeogh, Silver Spring, Md., assignors to the United States of America as represented by the Secretary of the Navy Filed Mar. 22, 1965, Ser. No. 441,938
7 Claims. (Cl. 328—48)

The invention described herein may be manufactured and used by or for the Government of the United States of America for governmental purposes without the payment of any royalties thereon or therefor.

This invention relates to electronic commutators and, in particular, to an improved ring counter having automatic self-start and reset insuring means.

Electronic commutators may be comprised of a plurality of bistable stages, each having two stable states designated as the set state and reset state, which are cascaded to form a ring. A stage is defined as being in the set state herein when the output of that stage which is coupled to the input of the subsequent stage of the ring is in the "1" condition in accordance with binary nomenclature. Conversely, the reset state exists when that output is in the "0" condition. Normal operation demands that only a single binary stage in the ring is in the set condition so that a stepping pulse applied to the ring effectively causes that single specific binary stage to be switched to the reset state and the next succeeding stage to be simultaneously switched to the set state. Similarly, each succeeding pulse applied to the ring input effectively causes the stage that is presently in the set state to be switched to the reset state and the next succeeding sage to be switched to the set state so that the set state steps from stage to stage in the ring. The last stage is usually, though not necessarily, coupled to the first stage so that the set condition proceeds automatically from the last stage in the ring to the first. Some commutators do not have a closed ring so that separate means are provided for turning on the first device in the ring. An output line exists for each binary stage of the ring but only one of the ring counter output lines will be in a condition to trigger a specific circuit of a group of circuits to be sequenced.

Occasionally, one or more stages of the ring counter may undergo an undesired change of state when a spurious pulse of proper magnitude and polarity occurs at the input to any of the bistable stages thus causing more than one pulse to be propagated through the ring to activate two or more commutator output lines simultaneously. Those concerned with the development of ring counter commutators have long recognized the need for a provision which prevents more than one set state from existing simultaneously for more than one cycle, as well as a provision for resetting stages when spurious pulses trigger any of those stages while the desired pulse is being propagated through the other stages of the ring.

Another feature desired in ring counters is a self-start operation which insures that the counter will start automatically upon application of power, even when all of the bistable stages might initially be in the reset condition. Also, in some operations, an additional feature is desired which provides a fixed delay at some point in the ring before the ring counter set condition is propagated to the next succeeding stage in the ring.

The general purpose of this invention is to provide a commutator circuit which provides a combination of desired features for overcoming the disadvantages of previous commutators. To attain this the present invention provides a commutator circuit comprising a ring counter having a plurality of bistable stages wherein the last stage is coupled to the first stage to form a ring, and which includes a resetting circuit triggered by one of the stages for resetting all of the previous stages, together with a self-starting circuit for triggering the counter for enabling it to begin cycling. An additional stage may be added, if desired, to provide a delay.

Accordingly, it is an object of the present invention to provide a new and improved electronic commutator.

Another object is to provide an electronic commutator which is free from most of the common types of failures.

A further object is to provide an electronic commutator which automatically corrects itself to insure that only a single stage is in the set condition.

Still another object is to provide an electronic commutator which is self-starting so that cycling always begins when power is applied.

Other objects and many of the attendant advantages of this invention will be readily appreciated as the same becomes better understood by reference to the following detailed description when considered in connection with the accompanying drawings in which like reference numerals designate like parts throughout the figures thereof and wherein.

Figure 1:
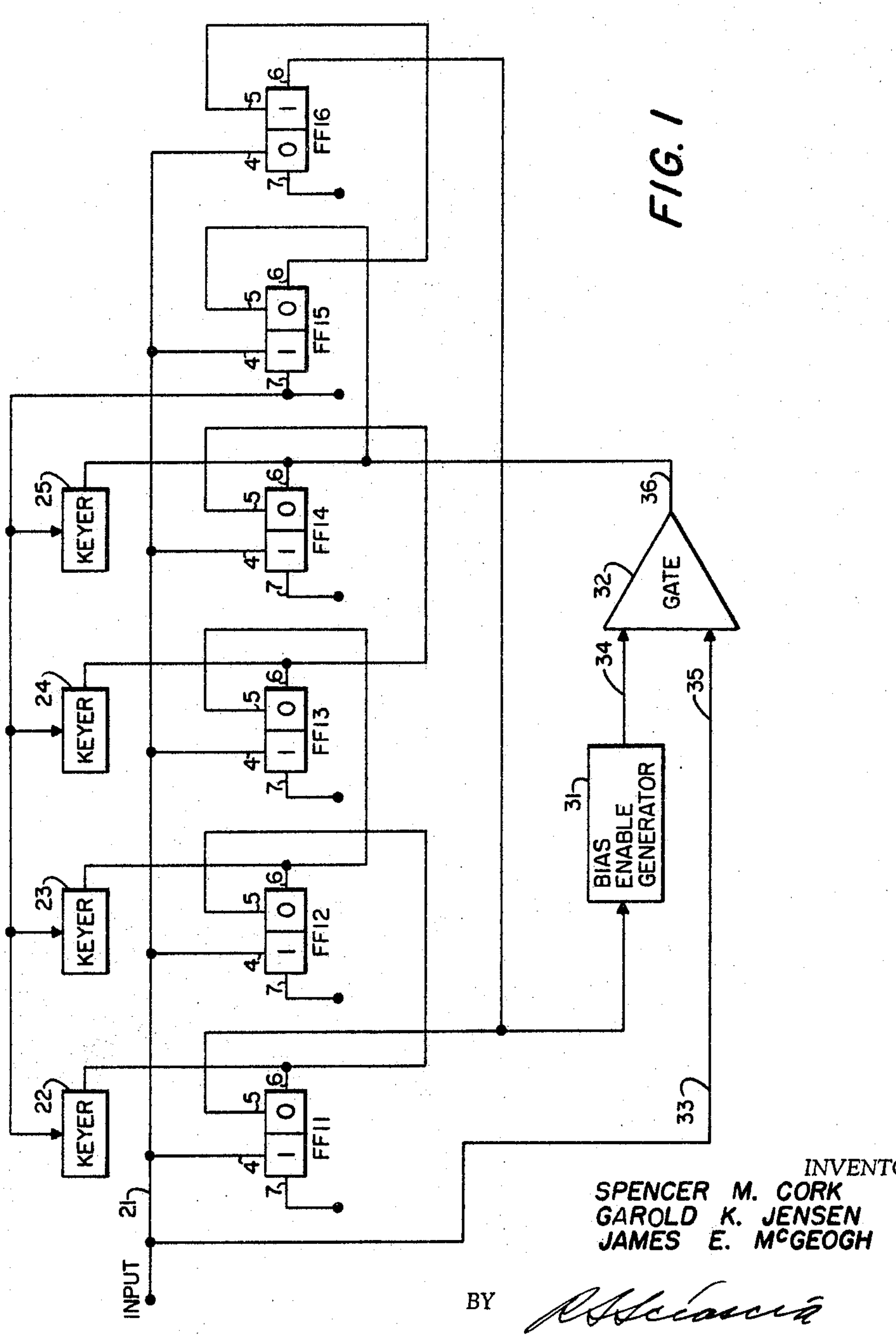
FIG. 1 illustrates a multistage ring counter including automatic resetting and self-starting circuitry.

Referring now to the drawings, there is shown in FIG. 1 a functional diagram of this invention including a ring counter comprising six cascaded bistable stages or flip-flops FF11 through FF16 wherein the state or condition of each flip-flop is illustrated at a time when stages FF11–FF15 are in the reset state, while FF16 is in the set state. Ring counter input line 21 is connected to the reset input 4 of each stage so that a stepping input pulse on line 21 will change the state of the flip-flop only if it is in the set condition. Output line 7 of each flip-flop provides the pulse which is used to trigger one of a series of circuit elements to be commutated. Output 6 of each stage is connected to input 5 of the next succeeding stage to change its state from reset to set when the former of the two stages switches from the set to reset state. Output 6 of the last stage, FF16, is connected to input 5 of the first stage, FF11, thereby forming a ring.

Output 7 of the next-to-last stage, FF15, is connected to plate keyer stages 22–25, each of which have outputs connected to terminal 6 of each of the preceding binary stages FF11–FF14 so that those stages will be reset when keyer circuits 22–25 are triggered by an output signal from FF15. Each of the conventional plate keyers employed in this invention comprise a triode having its control grid coupled to terminal 7 of FF15 and its plate directly connected to its respective ring counter stage as will be further described in relation to FIG. 3. However any other suitable circuit may be used which will produce a pulse of proper polarity and amplitude for resetting a stage of the ring counter upon being triggered by a positive going pulse from FF15.

The self-start circuit of this invention is also shown in FIG. 1 and includes a bias enable generator 31 connected between terminal 6 of FF16 and input 34 of gate 32. Generator 31 includes a charging element such as a capacitor that is charged to a voltage sufficient to cutoff or inhibit gate 32 as long as the ring counter is cycling and pulses are repetitively received from output 6 of FF16. If pulses cease to be received by the input of bias enable generator 31, the voltage on the charging element begins to decay toward a critical voltage level which enables gate 32 so that an input pulse received at input 35 through line 33 will produce a pulse at output 36 of gate 32 to set FF14. The next input pulse will then trigger FF14 into the reset condition and the ring counter will begin cycling. As long as the counter continues to cycle, gate 32 will be inhibited since the charging element of bias enable generator 31 will have its voltage restored to a value greater than that of the critical voltage level, thereby preventing input pulses from passing through gate 32.

Figure 2:
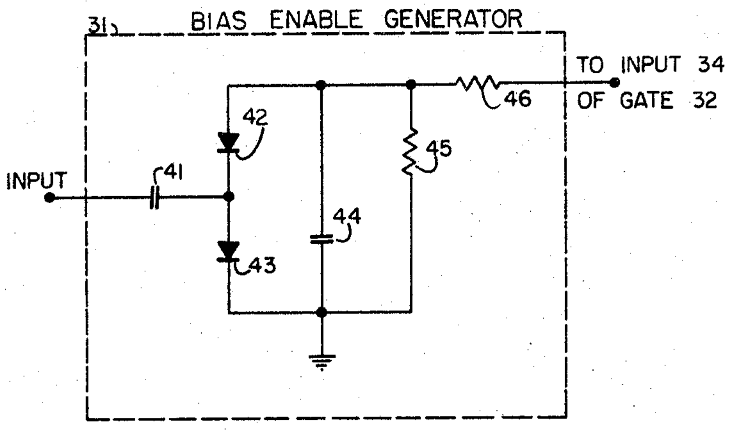
FIG. 2 is a circuit diagram of the bias enable generator of FIG. 1.

A circuit such as the peak-to-peak rectifier illustrated in FIG. 2 may be employed as the bias enable generator 31 of FIG. 1. The circuit 31 comprises an input coupling capacitor 41 connected to a point common to diodes 42 and 43 which are connected in parallel with charging capacitor 44 and resistor 45. Output resistor 46 is connected to input 34 of gate 32. The values of capacitor 44 and resistor 45 determine the decay time constant of the circuit which will control the amount of time after receipt of a pulse from the ring counter stage FF16 which must elapse before gate 32 is enabled. Any desired time constant may be employed depending upon the amount of ring counter failure time which can be tolerated. However, the minimum decay time should obviously be greater than the time of a complete cycle. After a period of time without power, it is obvious that no charge will be stored by the charging element and gate 32 will be enabled to pass the first input pulse which will set FF14.

Figure 3:
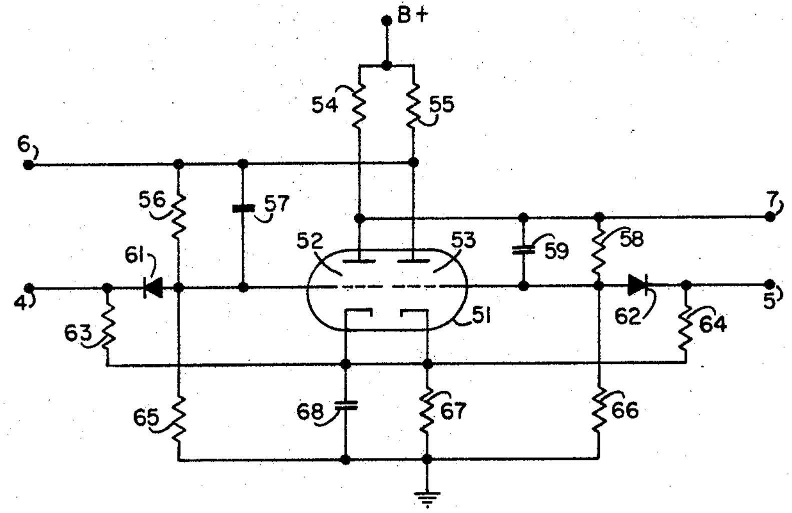
FIG. 3 is a circuit diagram of a bistable circuit which can be employed as a stage of the ring counter of FIG. 1.

A suitable bistable circuit or flip-flop to be used for elements FF11–FF16 of FIG. 1 is shown in FIG. 3. This is a standard flip-flop wherein either triode 52 or triode 53 of tube 51 will conduct at any given time. The terminals of flip-flop FF11–FF16 shown in FIG. 1 correspond to the terminals of the flip-flop of FIG. 3. The plates of each triode 52 and 53 are connected to a supply voltage through plate load resistors 54 and 55, respectively. The plate of triode 53 is connected to the grid of triode 52 through resistor 56 and capacitor 57 which are connected in parallel. Likewise, the plate of triode 52 is connected to the grid of triode 53 through resistor 58 and capacitor 59 connected in parallel. Inputs 4 and 5 are connected to the grids of their respective triodes by diodes 61 and 62 which are connected in the proper polarity to pass only negative-going pulses. Biasing resistor 63 is connected between input 4 and a common cathode connection, while biasing resistor 64 is connected between input 5 and the common cathode connection. Grid bias resistors 65 and 66 are connected between the grid of each triode and ground. The common cathode connection is also connected to ground through resistor 67 and by-pass capacitor 68 connected in parallel with resistor 67.

The flip-flop is biased so that a negative-going pulse at terminal 4 will cause triode 52, if initially conducting, to switch into a non-conducting state so that the flip-flop is reset. If the triode is initially non-conducting, then a negative-going trigger pulse on terminal 4 will have no effect on triode 52. A negative trigger pulse at terminal 4 will turn off triode 52 so that the plate of triode 52 rises to produce a positive-going pulse which is coupled through capacitor 59 to the grid of triode 53 to turn on triode 53. As triode 53 is driven into conduction, its plate voltage drops so that a negative-going pulse appears at terminal 6 which is coupled to terminal 5 of the next succeeding stage. The flip-flop will remain in the reset condition, that is, with triode 53 conducting, until a negative trigger appears at terminal 5 to cause tirode 53 to switch from the conducting state to the non-conducting state. Concurrently, triode 52 will change from the non-conducting to the conducting state.

Each of the plate keyers 22–25 of FIG. 1 will have their plates directly connected to the plate of triode 53 of their respective ring counter stages FF11–FF14 through terminal 6. When triggered, the plate keyers 22–25 will cause the potential at the grid of triodes 52 and the plate of triodes 53 of FF11–FF14 to drop, thereby turning off triodes 52 and turning triodes 53 on, if those triodes are not already in that condition. If a particular stage is already reset, the drop in potential at the plate of triode 53 will have no effect on that particular stage.

The output 36 of gate 32 is connected to terminal 6 of FF14 as shown in FIG. 1. When bias enable generator 31 enables gate 32, a negative-going stepping pulse at input 35 of gate 32 will produce a positive-going pulse at output 36 which is directly connected to the plate of triode 53 of FF14 through terminal 6 of FF14. The plate of triode 53 is cross-coupled to the control grid of triode 52 so that the positive-going pulse from gate 32 will turn on triode 52 and turn off triode 53 thereby causing FF14 to be in the set condition.

Initially, the flip-flops may be as shown in FIG. 1, with FF11–FF15 reset and FF16 set. When a negative input stepping pulse appears on line 21, the only flip-flop affected is FF16, which changes from set to reset. At the same time a negative-going trigger appears at terminal 6 which is connected to terminal 5 of FF11. Triode 53 of FF11 will then be cut off thereby changing FF11 from reset to set with terminal 7 changing from positive to negative. FF11 will remain in that condition until the next negative stepping pulse appears on input line 21. Consequently, a negative signal will sequentially be present at terminal 7 of each succeeding stage as the stepping pulses are received by the ring counter.

During the resetting operation, plate keyers 22–25 are triggered by a positive-going pulse at terminal 7 of FF15 which occurs when FF15 changes from set to reset. Each of the keyer outputs is connected to the plate of triode 53 of its respective flip-flop through terminal 6 to lower the potential at the plate. If any of the stages FF11–FF14 are set, the drop in potential at the plate is cross-coupled to the grid of triode 52 so that triode 53 is biased into conduction while triode 52 is turned off. If a particular flip-flop is already in the reset condition, then its respective keyer has no effect upon it. In that case the voltage swing at the plate of triode 53 of flip-flop FF14 (terminal 6) is not sufficient to set the next flip-flop stage FF15. In the rare event that FF14 is accidentally set by a spurious pulse just before the keyers are triggered, triode 53 of FF14 is non-conducting and its plate potential is near the plate bias voltage. At that same time FF15 is in set condition. When the next stepping pulse is applied to the ring counter, FF15 is reset, FF16 is set, and a positive pulse at terminal 7 of FF15 triggers the plate keyers 22–25 to reset any of the flip-flops FF11–FF14 which may be set. Since FF14 had been accidentally set, its plate potential drops sufficiently to produce a negative-going pulse at terminal 5 of FF15, the amplitude of which is adequate to change FF15 from reset to set. Consequently, both FF15 and FF16 are then in the set condition. However the counter quickly corrects itself as stages FF15 and FF16 are triggered by the next stepping pulse which caused the setting of FF16 and FF11. As FF15 changes from set to reset the plate keyers 22–25 are triggered and FF11 is immediately reset so that only a single stage, FF16, is in the set condition.

In summary, the circuit of this invention provides a ring counter having $n+2$ bistable stages wherein resetting means are operatively coupled to each of $n$ stages for resetting any of those $n$ stages which may have been accidentally set by a spurious pulse either during normal operation or when power is first applied to the circuit. The resetting means are triggered once during each cycle at the time during which the $n+1$ stage changes from set to reset and the $n+2$ stage is set, thereby insuring that the $n$ stages are in the reset condition. In the event that more than one stage is in the set condition, the circuit will quickly correct itself so that only a single stage is set. In addition, the circuit provides a self-start feature wherein a stepping pulse applied to the ring is allowed to pass through a gate, which is enabled when a predetermined amount of time has elapsed since the last cycle, to set a given stage of the ring counter. Normal operation will then commence when the next stepping pulse is applied to the ring. This feature also allows the ring counter to start cycling automatically if the stages are all in the reset state when cycling is to begin.

Obviously many modifications and variations of the present invention are possible in the light of the above teachings. It is therefore to be understood, that within the scope of the appended claims, the invention may be practiced otherwise than as specifically described.

What is claimed and desired to be secured by Letters Patent of the United States is:

1. A ring counter having a stepping input for commutating up to and including $n+2$ channels, where $n$ is an integer, comprising:

$n+2$ serially coupled bistable stages, each stage having a reset input connected to said stepping input for receiving stepping pulses, a set input, a set output and a commutating output, with the set output of each stage coupled to the set input of the next-succeeding stage, and wherein the set output of said $n+2$ stage is coupled to the set input of the first stage to form a ring, and means triggered by the commutating output of the $n+1$ stage for resetting the first $n$ of said stages.

2. The ring counter of claim 1 further including gating means having a first and second input and an output, with said output connected to set one of said stages and said first input connected to said stepping input of said ring counter, and timing means coupled between said set output of said $n+2$ stage and said second input for inhibiting said gating means when said ring counter is cycling and enabling said gating means when said counter fails to cycle.

3. The ring counter of claim 2 wherein said timing means comprises a charging element which is charged to bias said second input of said gating means for inhibiting said gating means while said counter cycles and which is discharged so that said gate is enabled when said counter fails to cycle.

4. The ring counter of claim 3 wherein said means for resetting $n$ stages comprises $n$ keyer circuits each coupled to reset one of said $n$ bistable stages.

5. A ring counter having a stepping input for commutating up to and including $n+2$ channels, where $n$ is an integer, comprising:

$n+2$ serially coupled bistable stages, each stage having a reset input connected to said stepping input, a set input, a set output and a commutating output, with the set output of each stage coupled to the set input of the next-succeeding stage to form a ring, gating means having a first and second input and an output, with said output connected to set one of said stages and said first input connected to said stepping input of said ring counter, and timing means coupled between said set output of said $n+2$ stage and said second input for inhibiting said gating means while said ring counter is cycling and enabling said gating means when said counter fails to cycle.

6. The ring counter of claim 5 wherein said timing means comprises a charging element which is charged to bias said second gating means input for inhibiting said gating means while said counter cycles and which is discharged so that said gate is enabled when said counter fails to cycle.

7. A ring counter for commutating up to and including $n+2$ channels, where $n$ is an integer, comprising:

$n+2$ serially coupled bistable stages, each stage having a reset input connected to a stepping input, a set input, a set output and a commutating output, with the set output of each stage coupled to the set input of the next-succeeding stage to form a ring, and $n$ keyer circuits each triggered by the commutating output of the $n+1$ stage and each respectively coupled to the reset input of one of said first $n$ bistable stages.

References Cited

UNITED STATES PATENTS

| | | | |
|---|---|---|---|
| 2,551,119 | 5/1951 | Haddad et al. | 328—43 XR |
| 2,560,968 | 7/1951 | MacSorley | 328—48 |
| 2,562,591 | 7/1951 | Wagner et al. | 328—48 XR |

ARTHUR GAUSS, *Primary Examiner.*

J. KAZWORSKY, *Assistant Examiner.*